United States Patent
Wohlgemuth et al.

(10) Patent No.: US 9,702,024 B2
(45) Date of Patent: Jul. 11, 2017

(54) METHOD FOR THE HYDROMETALLURGICAL RECOVERY OF LITHIUM, NICKEL AND COBALT FROM THE LITHIUM TRANSITION METAL OXIDE-CONTAINING FRACTION OF USED GALVANIC CELLS

(71) Applicant: Rockwood Lithium GmbH, Frankfurt am Main (DE)

(72) Inventors: David Wohlgemuth, Frankfurt (DE); Mark Andre Schneider, Friedrichsdorf-Burgholzhausen (DE); Rebecca Spielau, Eppstein (DE); Johannes Willems, Frankfurt (DE); Martin Steinbild, Frankfurt (DE)

(73) Assignee: Rockwood Lithium GmbH (DE)

( * ) Notice: Subject to any disclaimer, the term of this patent is extended or adjusted under 35 U.S.C. 154(b) by 34 days.

(21) Appl. No.: 14/433,099

(22) PCT Filed: Oct. 9, 2013

(86) PCT No.: PCT/EP2013/003028
§ 371 (c)(1),
(2) Date: Apr. 2, 2015

(87) PCT Pub. No.: WO2014/056609
PCT Pub. Date: Apr. 17, 2014

(65) Prior Publication Data
US 2015/0247216 A1    Sep. 3, 2015

(30) Foreign Application Priority Data

Oct. 10, 2012 (DE) .......... 10 2012 218 464
Oct. 10, 2012 (DE) .......... 10 2012 218 465
Oct. 10, 2012 (DE) .......... 10 2012 218 467

(51) Int. Cl.
| | |
|---|---|
| C22B 26/00 | (2006.01) |
| C22B 26/12 | (2006.01) |
| C22B 7/00 | (2006.01) |
| C01B 25/45 | (2006.01) |
| C01G 51/00 | (2006.01) |
| C01G 53/00 | (2006.01) |
| C22B 3/00 | (2006.01) |
| H01M 10/54 | (2006.01) |

(52) U.S. Cl.
CPC .............. C22B 26/12 (2013.01); C01B 25/45 (2013.01); C01G 51/42 (2013.01); C01G 53/42 (2013.01); C22B 7/007 (2013.01); C22B 23/043 (2013.01); C22B 23/0461 (2013.01); H01M 10/54 (2013.01); C01P 2006/40 (2013.01); Y02P 10/234 (2015.11); Y02W 30/84 (2015.05)

(58) Field of Classification Search
USPC .................................... 423/179.5; 204/537
IPC ............... C22B 26/12,23/043, 23/0461, 7/007; C01G 53/42, 51/42; H01M 10/54; C01B 25/45
See application file for complete search history.

(56) References Cited

U.S. PATENT DOCUMENTS

| | | | |
|---|---|---|---|
| 6,261,712 B1 * | 7/2001 | Hayashi ............ | H01M 10/54 423/179.5 |
| 8,945,275 B2 | 2/2015 | Sonu et al. | |
| 2013/0192425 A1 * | 8/2013 | Sonu ............. | C22B 3/0068 75/743 |
| 2013/0206607 A1 * | 8/2013 | Kojima ........... | C22B 7/007 205/589 |

FOREIGN PATENT DOCUMENTS

| | | |
|---|---|---|
| CN | 102036739 A | 4/2011 |
| DE | 198 42 658 A1 | 4/1999 |
| FR | 2 796 207 A1 | 1/2001 |
| WO | 2010056322 A1 | 5/2010 |
| WO | 2012/050317 A2 | 4/2012 |
| WO | 2012/072619 A1 | 6/2012 |

OTHER PUBLICATIONS

Shin, et al. "Development of a metal recovery process from Li-ion battery wastes", Hydrometallurgy 79 (2005), pp. 172-181.

* cited by examiner

Primary Examiner — Steven Bos
(74) Attorney, Agent, or Firm — Jeremy J. Kliebert

(57) ABSTRACT

A method for the hydrometallurgical recovery of lithium from a lithium transition metal oxide containing fraction of used galvanic cells is disclosed. According to the method, the lithium transition metal oxide containing fraction is introduced into sulphuric acid or hydrochloric acid, and hydrogen peroxide is added in an amount that is at least stoichiometric relative to the transition metal content to be reduced of the lithium transition metal oxide-containing fraction.

28 Claims, 3 Drawing Sheets

| Test number | S/L [g/l] | H₂SO₄ excess | H₂O₂ excess-/deficit | Process conditions | Li [wt.%] | Ni [wt.%] | Mn [wt.%] | Co [wt.%] | Al [wt.%] |
|---|---|---|---|---|---|---|---|---|---|
| 1 | 56 | 1 M 11 mol% | 35 mol% | 3 h, 80 °C | 98.4 | 100 | 96.7 | 100 | 96.3 |
| 2 | 51 | 1 M 22 mol% | 45 mol% | 0.75 h, 80 °C | 98.9 | 96.6 | 92.3 | 98.7 | 84.4 |
| 3 | 51 | 1 M 22 mol% | 45 mol% | 2.5 h, 55 °C | 100 | 95.5 | 96.0 | 96.2 | 47.6 |
| 4 | 97 | 2 M 27 mol% | -25 mol% | 1 h, 55 °C | 98.4 | 62.2 | 75.7 | 77.1 | 80.0 |
| 5 | 49 | 1 M 27 mol% | 50 mol% | 1 h, 55 °C | 100 | 97.1 | 97.8 | 96.6 | 89.8 |
| 6 | 94 | 2 M 27 mol% | 50 mol% | 3 h, 55 °C | 99.7 | 98.1 | 97.4 | 97.3 | 89.3 |
| 7 | 49 | 1 M 27 mol% | 50 mol% | 2.25 h, 55 °C | 100 | 100 | 100 | 99.0 | 67.0 |
| 8 | 50 | 1 M 27 mol% | -25 mol% | 2.25 h, 55 °C | 99.6 | 100 | 100 | 100 | 96.5 |
| 9 | 141 | 3 M 27 mol% | 0 mol% | 6 h, 55 °C | 100 | 100 | 100 | 100 | 100 |
| 10 | 126 | 2.5 M 18 mol% | 18 mol% | 1.5 h, 55 °C | 99.5 | 99.8 | 99.6 | 97.6 | not present |
| 11 | 126 | 2.5 M 18 mol% | 18 mol% | 4 h, 55 °C | 96.9 | 99.8 | 99.8 | 96.9 | not present |

Table 1

Fig. 1

| Example | S/L [g/l] | Acid excess | H₂O₂ excess | Process conditions | Li [%] | Ni [%] | Co [%] | Al [%] |
|---|---|---|---|---|---|---|---|---|
| 12 | 113 | 2M H₂SO₄ 5% | 30% 5% | 2.5h, 55°C | 100 | 100 | 100 | 100 |
| 13 | 118 | 2M H₂SO₄ 0.1% | 30% 7% | 2.5h, 55°C | 100 | 100 | 100 | 100 |
| 14 | 114 | 2M H₂SO₄ 3% | 30% 5% | 2.25h, 55°C | 100 | 100 | 100 | 100 |
| 15 | 118 | 2M H₂SO₄ 0.5% | 30% 4% | 2.5h, 55°C | 100 | 100 | 100 | 100 |
| 16 | 118 | 2M H₂SO₄ 0.1% | 30% 5% | 1.25h, 55°C | 100 | 100 | 100 | 100 |
| 17 | 115 | 2M H₂SO₄ 2% | 30% 5% | 1.8h, 55°C | 100 | | 100 | 100 |

Table 2

Fig. 2

| Example | S/L [g/l] | Acid-/ deficiency | H₂O₂ excess | Process conditions | Li [%] | Ni [%] | Co [%] | Al [%] |
|---|---|---|---|---|---|---|---|---|
| 18 | 50 | 2M HCl<br>*7 mol%* | 30%<br>*500 mol%* | 3.5h, 80°C | 100 | 100 | 100 | 100 |
| 19 | 100 | 2M HCl<br>*-45 mol%* | 30%<br>*500 mol%* | 2.5h, 80°C | 68.7 | 87.7 | 39.1 | <0.1 |
| 20 | 50 | 2.5M HCl<br>*34 mol%* | 30%<br>*500 mol%* | 1.5h, 80°C | 100 | 100 | 100 | 100 |

Table 3

Fig. 3

METHOD FOR THE HYDROMETALLURGICAL RECOVERY OF LITHIUM, NICKEL AND COBALT FROM THE LITHIUM TRANSITION METAL OXIDE-CONTAINING FRACTION OF USED GALVANIC CELLS

This application is a §371 of International Application No. PCT/EP2013/003028 filed Oct. 9, 2013, and claims priority from German Patent Application No. 10 2012 218 465.1 filed Oct. 10, 2012, German Patent Application No. 10 2012 218 464.3 filed Oct. 10, 2012, and German Patent Application No. 10 2012 218 467.8 filed Oct. 10, 2012, each of which is incorporated by reference herein in its entirety for all purposes.

The subject matter of the invention is a method for the hydrometallurgical recovery of lithium, nickel, cobalt from the fraction of used galvanic cells containing lithium transition metal oxides Mobile electronic devices require increasingly powerful rechargeable batteries for self-sufficient power supply. For this purpose, lithium-ion batteries are used on account of the energy density thereof expressed in Wh/kg, cycling stability and low self-discharge. Very widespread are lithium-ion batteries with transition metal oxides as active cathode material. The active cathode material in these batteries consists of lithium transition metal oxides, from which lithium ions are released during charging and intercalated in the anode material. Of particular importance are the mixed oxides of lithium with that of nickel, cobalt and/or manganese, which are also known under the abbreviation NMC-cells or -batteries and also the mixed oxides of lithium with those of nickel, cobalt and/or aluminum, which are also known under the abbreviation NMC-cells or -batteries. High capacity lithium accumulators are used on a large scale for stationary applications (power back-up) or in the automobile field for traction purposes (hybrid drive or pure electric drive). With respect to energy density in the latter applications, NMC-batteries are recognized as being of outstanding importance. Since the amount of recyclable material contained therein grows with the size and number of the manufactured, charged and reused batteries, an economical method for recovery of the lithium within the batteries is indispensable.

A method for recovery of lithium from the LiFePO$_4$-containing fraction of shredded and sifted cells is known from the document WO 2012/072619 A1, in which the fraction containing LiFePO$_4$ is treated with acid solution in the presence of an oxidizing agent. The dissolved-out lithium ions are separated from undissolved iron phosphate and precipitate out as salts from the lithium-containing solution. The hydrometallurgical reclamation takes place with sulphuric acid accompanied by introduction of oxygen, ozone or addition of hydrogen peroxide in the temperature range of 80° C. to 120° C.

Disadvantages of this method are the high energy intensity of the extraction process, the high requirements with respect to corrosion resistance of the apparatus used and the purity of the lithium salt obtained by precipitation.

BRIEF DESCRIPTION OF THE DRAWINGS

FIG. 1 depicts Table 1, which shows 11 tests were carried out under the stated conditions with a lithium transition metal-containing fraction of NMC-cells.

FIG. 2 depicts Table 2, which shows 6 tests were carried out under the stated conditions with a lithium transition metal-containing fraction of NMC-cells.

FIG. 3 depicts Table 3, which shows 3 tests were carried out under the stated conditions with a lithium transition metal-containing fraction of NMC-cells.

The object of the invention is to provide a method, which ensures the highest possible energy efficiency in the extraction of lithium with concurrent low requirements with respect to corrosion resistance of the apparatus used and increased purity of the lithium compounds obtained.

The stated object is achieved by a method for hydrometallurgical recovery of lithium, nickel, cobalt from the fraction containing lithium transition metal oxide of used galvanic cells, in which a fraction containing lithium transition metal oxides, wherein the transition metals are nickel, cobalt and/or manganese, having an aluminum content up to 5 wt. % and a particle size up to 500 μm is introduced into sulphuric acid having a concentration of 0.5 to 4 mol/l in an amount that is at least stoichiometric relative to the oxide content of the fraction containing lithium transition metal oxide and in a solid/liquid ratio in the range of 20 to 250 g/l, and solubilization takes place with addition of hydrogen peroxide at temperatures of 35 to 70° C. in an amount that is at least stoichiometric relative to the transition metal content to be reduced of the fraction containing lithium transition oxide, the solution containing the formed lithium sulphate and sulphates formed from the mentioned transition metals is separated off and the remaining residue is washed at least twice, the separated sulphates and the solution containing sulphates are combined, the transition metals are precipitated as hydroxides in the pH range of 9 to 11 as hydroxides, separated off and washed and the remaining lithium sulphate-containing solutions are incorporated and are converted to lithium hydroxide by electrodialysis on bipolar membranes.

Alternatively, the object is achieved by a method for hydrometallurgical recovery of lithium from the lithium transition metal oxide-containing fraction of used galvanic cells, in which a fraction containing lithium transition metal oxides composed of mixed oxides of metals such as nickel, cobalt and/or aluminum with a particle size up to 500 μm is introduced into sulphuric acid having a concentration of 0.5 to 4 mol/l in an amount that is at least stoichiometric relative to the oxide content of the fraction containing lithium transition metal oxide, and in a solid/liquid ratio in the range of 20 to 300 g/l and solubilization takes place with addition of at least a stoichiometric amount of hydrogen peroxide relative to the transition metal content to be reduced of the fraction containing lithium mixed oxides at temperatures of 35 to 70° C., the formed lithium sulphate and the solution containing the sulphates of the mentioned transition metals are separated off and the remaining residue is washed at least twice, the separated off lithium sulphate and lithium sulphate-containing washing solution are combined, the transition metals are precipitated in the pH range of 9 to 11 as the hydroxide, separated off and washed and the remaining lithium sulphate containing solution is incorporated and is converted by electrolysis with bipolar membranes into lithium hydroxide.

The object is likewise achieved by a method for hydrometallurgical recovery of lithium from the lithium transition metal oxide-containing fraction of used galvanic cells, in which a fraction containing lithium transition metal oxides composed of mixed oxides of metals such as nickel, cobalt and/or aluminum with a particle size up to 500 μm is introduced into hydrochloric acid having a concentration of 0.5 to 4 mol/l in an amount that is at least stoichiometric relative to the oxide content of the fraction containing lithium transition metal oxide, and in a solid/liquid ratio in the range of 10 to 150 g/l and solubilization takes place with addition of at least a stoichiometric amount of hydrogen peroxide with respect to the transition metal content to be reduced of the fraction containing lithium mixed oxides at temperatures of 35 to 70° C., the formed lithium chloride and the chlorides of the solution containing the mentioned transition metals are separated off and the remaining residue is washed at least twice, the separated off metal chloride and wash-solution containing metal chloride are combined, the transition metals are precipitated in the pH range of 9 to 11 as the hydroxide, separated off and washed and the remaining lithium chloride-containing solution is incorporated and is converted by electrolysis with bipolar membranes into lithium hydroxide.

Surprisingly, it was found that the extraction of lithium takes place in a very brief reaction time, nearly quantitatively at low temperatures. Thereby, a virtually-autocatalytic decomposition of the oxidizing agent can be generally avoided, since the metering of the reducing agent is controlled and kept very low. For the extraction of lithium, stoichiometric amounts of reducing agent must be used exclusively.

Thereby, the contained lithium is solubilized to more than 99 wt. % under the specified mild, hydrometallurgical dissolution conditions and recovered at more than 95 wt. %.

A fraction containing lithium transition metal oxide having an aluminum content of up to 3 wt. %, preferably <1 wt. % is used. Thereby the generation of a flammable, explosive gas mixture is further decreased.

Preferably the content of multivalent metal cations is further reduced by means of an ion exchanger. The reduced content of multivalent ions has a particularly positive effect on further processing of the solution by means of electrodialysis with bipolar membranes, since these metal cations act as "membrane poisons" due to deposition thereof in the hydroxide form in and on the membranes used.

More preferably the fraction containing lithium transition metal oxide has a particle size up to 500 μm, preferably 100 to 400 μm. The use of the mentioned particle size improves the stated particle size and the dissolution behavior.

Advantageously, the sulphuric acid or hydrochloric acid is used at a concentration of 0.75 to 2.5 mol/l, preferably 1.0 to 2.0 mol %/l. The use of sulphuric acid or hydrochloric acid in the stated concentration range considerably reduces the requirements for corrosion resistance of the apparatus used.

Particularly preferably in the case of the NMC-cells and use of sulphuric acid, the solid/liquid ratio is adjusted in the range of 50 to 180 g/l. Preferably in the case of the NMC-cells and use of sulphuric acid, the solid/liquid ratio is adjusted in the range of 50 to 250 g/l, preferably 60 to 150 g/l. Regardless of the high solids content in the reaction mixture, the contained lithium is nearly quantitatively dissolved. In the case of the NMC-cells and use of hydrochloric acid, the solid/liquid ratio is adjusted in the range of 15 to 120 g/l, preferably 25 to 65 g/l.

Preferably the solubilization is carried out at temperatures of 30 to 65° C., preferably at 40 to 60° C. Surprisingly, the effectiveness of the dissolution of the lithium is thereby not substantially influenced by the run time or the amount. The mentioned temperature range is adjustable with ordinary technical equipment.

Advantageously, the solubilization residue is washed at least three times. It was found, that thereby more than 95 wt. % of the contained lithium can be obtained.

Preferably the sulphuric acid or the hydrochloric acid and/or the hydrogen peroxide is used in excess. Particularly preferably an excess of 0.1 to 10 mol % is used, preferably 0.5 to 5 mol %.

The product made according to the method is suitable with respect to the purity thereof for production of lithium transition metal oxides or lithium transition metal phosphates and may preferably be used to make active materials for use in cathodes of lithium-ion batteries.

The process according to the invention is generally described hereafter.

EXAMPLES

The invention is explained on the basis of the following examples and Tables 1 to 3.

Under the conditions listed in Table 1, 11 tests were carried out under the stated conditions with a lithium transition metal-containing fraction of NMC-cells.

Under the conditions listed in Table 2, 6 tests were carried out under the stated conditions with a lithium transition metal-containing fraction of NMC-cells.

Under the conditions listed in Table 3, 3 tests were carried out under the stated conditions with a lithium transition metal-containing fraction of NMC-cells.

The invention claimed is:

1. A method for hydrometallurgical recovery of lithium, nickel, and cobalt from a fraction of used galvanic cells containing lithium transition metal oxides comprising the steps of:
   introducing a fraction containing lithium transition metal oxides, wherein the transition metals are nickel, cobalt and/or manganese, having an aluminum content up to 5 wt. % and a particle size up to 500 μm into sulphuric acid having a concentration of 0.5 to 4 mol/l in an amount that is at least stoichiometric relative to the oxide content of the fraction containing lithium transition metal oxides and in a liquid/solid ratio in a range of 20 to 250 g/l;
   solubilizing the lithium contained in the fraction containing lithium transition metal oxides with addition of at least a stoichiometric amount of hydrogen peroxide relative to the transition metal content of the fraction containing lithium transition metal oxide at temperatures of 35 to 70° C., wherein a solution containing lithium sulphate and sulphates of the transition metals is formed;
   separating the lithium sulphate and the sulphates of the transition metals from a remaining residue; and
   washing the remaining residue at least twice, wherein a washing solution containing lithium sulphate-containing washing solution is formed;
   wherein the separated lithium sulphate and the lithium sulphate-containing washing solution are combined,
   wherein the transition metals are precipitated as hydroxides in the pH range of 9 to 11, and the transition metals are separated and washed, and
   wherein the combined lithium sulphate and the lithium sulphate-containing washing solution is converted by means of electrodialysis with bipolar membranes into lithium hydroxide.

2. A method according to claim 1, wherein a fraction containing lithium transition metal oxide is used having an aluminum content up to 3 wt. %.

3. A method according to claim 1, wherein a content of multivalent cations is reduced by means of an ion exchanger.

4. A method according to claim 1, wherein the fraction containing the lithium transition metal oxide has a particle size up to 100 to 400 µm.

5. A method according to claim 1, wherein the sulphuric acid is used at a concentration of 0.75 to 2.5 mol/l.

6. A method according to claim 1, wherein the solid/liquid ratio is adjusted in the range of 30 to 230 g/l.

7. A method according to claim 1, wherein the solubilizing step is carried out at temperatures of 35 to 65° C.

8. A method according to claim 1, wherein the remaining residue is washed at least three times.

9. A method according to claim 1, wherein the sulphuric acid and/or the hydrogen peroxide is used in excess.

10. A method according to claim 9, wherein an excess of 0.1 to 10 mol % of the sulphuric acid and/or the hydrogen peroxide is used.

11. A method for hydrometallurgical recovery of lithium, nickel, and cobalt from a fraction of used galvanic cells containing lithium transition metal oxides, comprising the steps of:
    introducing a fraction containing lithium transition metal oxides, wherein the lithium transition metal oxides are oxides comprising nickel, cobalt and/or aluminum, having a particle size up to 500 µm into sulphuric acid having a concentration of 0.5 to 4 mol/l in an amount that is at least stoichiometric relative to the oxide content of the fraction containing lithium transition metal oxide and in a liquid/solid ratio in the range of 20 to 300 g/l;
    solubilizing the lithium contained in the fraction containing lithium transition metal oxides with addition of at least a stoichiometric amount of hydrogen peroxide relative to the transition metal content of the fraction containing lithium mixed oxide at temperatures of 35 to 70° C., wherein a solution containing lithium sulphate and sulphates of the transition metals is formed;
    separating the lithium sulphates and sulphates of the transition metals from a remaining residue, and
    washing the remaining residue at least twice, wherein a lithium sulphate-containing washing solution is formed, and
    wherein the separated lithium sulphate and the lithium sulphate-containing washing solution are combined,
    wherein the transition metals are precipitated as hydroxides in the pH range of 9 to 11, and the transition metals are separated and washed, and
    wherein the combined lithium sulphate and the lithium sulphate-containing washing solution is converted into lithium hydroxide by means of electrodialysis with bipolar membranes.

12. A method according to claim 11, wherein a content of multivalent cations is reduced by means of an ion exchanger.

13. A method according to claim 11, wherein the fraction containing the lithium transition metal oxide has a particle size up to 100 to 400 µm.

14. A method according to claim 11, wherein the sulphuric acid is used at a concentration of 0.75 to 2.5 mol/l.

15. A method according to claim 11, wherein the solid/liquid ratio is in the range of 50 to 250 g/l.

16. A method according to claim 11, wherein the solubilizing step is carried out at temperatures of 35 to 65° C.

17. A method according to claim 11, wherein the remaining residue is washed at least three times.

18. A method according to claim 11, wherein the sulphuric acid and/or the hydrogen peroxide is used in excess.

19. A method according to claim 18, wherein an excess of 0.1 to 10 mol % of the sulphuric acid and/or the hydrogen peroxide is used.

20. A method for hydrometallurgical recovery of lithium, nickel, and cobalt from a lithium mixed-oxide-containing fraction of used galvanic cells, comprising the steps of introducing a fraction containing lithium transition metal oxides, wherein the lithium transition metal oxides are metal oxides of nickel, cobalt and/or aluminum, having a particle size up to 500 µm into hydrochloric acid having a concentration of 0.5 to 4 mol/l in an amount that is at least stoichiometric relative to the oxide content of the fraction containing lithium transition metal oxides, and in a solid/liquid ratio in the range of 10 to 150 g/l;
    solubilizing the lithium contained in the fraction containing lithium transition metal oxides with addition of at least a stoichiometric amount of hydrogen peroxide with respect to the transition metal content of the fraction containing lithium metal oxides at temperatures of 35 to 70° C., wherein a solution containing lithium chloride and chlorides of the transition metals is formed;
    separating the lithium chloride and chlorides of the transition metals from a remaining residue, and
    washing the remaining residue at least twice to form a metal chloride-containing wash-solution, and
    wherein the separated lithium chloride and chlorides of the transition metals and the metal chloride-containing wash-solution are combined,
    wherein the transition metals are precipitated in the pH range of 9 to 11 as hydroxides, and the transition metals are separated and washed, and
    wherein the combined lithium chloride and metal chloride-containing wash solution is converted by electrodialysis with bipolar membranes into lithium hydroxide.

21. A method according to claim 20, wherein a content of multivalent cations is reduced by means of an ion exchanger.

22. A method according to claim 20, wherein the fraction containing the lithium transition metal oxide has a particle size up to 100 to 400 µm.

23. A method according to claim 20, wherein the hydrochloric acid is used at a concentration of 0.75 to 2.5 mol/l.

24. A method according to claim 20, wherein the solid/liquid ratio is in the range of 15 to 120 g/l.

25. A method according to claim 20, wherein the solubilizing step is carried out at temperatures of 35 to 65° C.

26. A method according to claim 20, wherein the remaining residue is washed at least three times.

27. A method according to claim 20, wherein the hydrochloric acid and/or the hydrogen peroxide is used in excess.

28. A method according to claim 27, wherein an excess of 0.1 to 10 mol % of the hydrochloric acid and/or the hydrogen peroxide is used.

* * * * *